United States Patent [19]

Benkmann et al.

[11] 4,299,595
[45] Nov. 10, 1981

[54] METHOD OF OPERATING A CYCLICAL PRESSURE-SWING ADSORPTION INSTALLATION

[75] Inventors: Christian Benkmann; Paul Leitgeb; Stefan Asztalos, all of Munich, Fed. Rep. of Germany

[73] Assignees: Linde Aktiengesellschaft, Wiesbaden, Fed. Rep. of Germany; Bayer Antwerpen N.V., Antwerp, Belgium; a part interest

[21] Appl. No.: 98,508

[22] Filed: Nov. 29, 1979

[30] Foreign Application Priority Data

Nov. 30, 1978 [DE] Fed. Rep. of Germany ....... 2851847

[51] Int. Cl.³ ............................................ B01D 53/04
[52] U.S. Cl. ........................................ 55/21; 55/25; 55/58; 55/62; 55/75
[58] Field of Search .................. 55/21, 25, 26, 31, 33, 55/58, 62, 68, 75, 161–163, 179, 180, 189, 208, 389

[56] References Cited

U.S. PATENT DOCUMENTS

| | | | |
|---|---|---|---|
| 3,378,992 | 4/1968 | Pierce et al. | 55/62 |
| 3,775,946 | 12/1973 | Brazzel | 55/62 X |
| 3,986,849 | 10/1976 | Fuderer et al. | 55/25 |
| 4,101,298 | 7/1978 | Myers et al. | 55/163 |
| 4,140,495 | 2/1979 | Pietruszewski | 55/21 |
| 4,197,095 | 4/1980 | White, Jr. et al. | 55/21 X |

FOREIGN PATENT DOCUMENTS

| | | | |
|---|---|---|---|
| 2624346 | 12/1977 | Fed. Rep. of Germany | 55/25 |
| 601035 | 4/1978 | U.S.S.R. | 55/161 |

*Primary Examiner*—Robert H. Spitzer
*Attorney, Agent, or Firm*—Karl F. Ross

[57] ABSTRACT

A method of operating a multi-adsorber pressure-swing adsorber installation in which each adsorber is, in a given cycle, operated for a plurality of time slots in an adsorption stage, subjected to a plurality of pressure-relief phases over corresponding time slots by pressure equalization with other adsorbers, the pressure-relief phases are followed by purging phases and ultimately pressure buildup phases likewise by pressure equalization with other adsorbers. According to the invention, upon the detection of a pressure condition, either by direct measurement of pressure or by measurement of another parameter, deviating from a setpoint value indicating a defect in one adsorber or its valve or duct systems, this adsorber is cut out of the system and the remaining adsorbers are continued to be cycled or are temporarily retained in a previous phase with readjustment of the sequencing so that the feed and output remain continuous, the remaining adsorber sequences corresponding to the number of adsorbers which remain operative.

14 Claims, 8 Drawing Figures

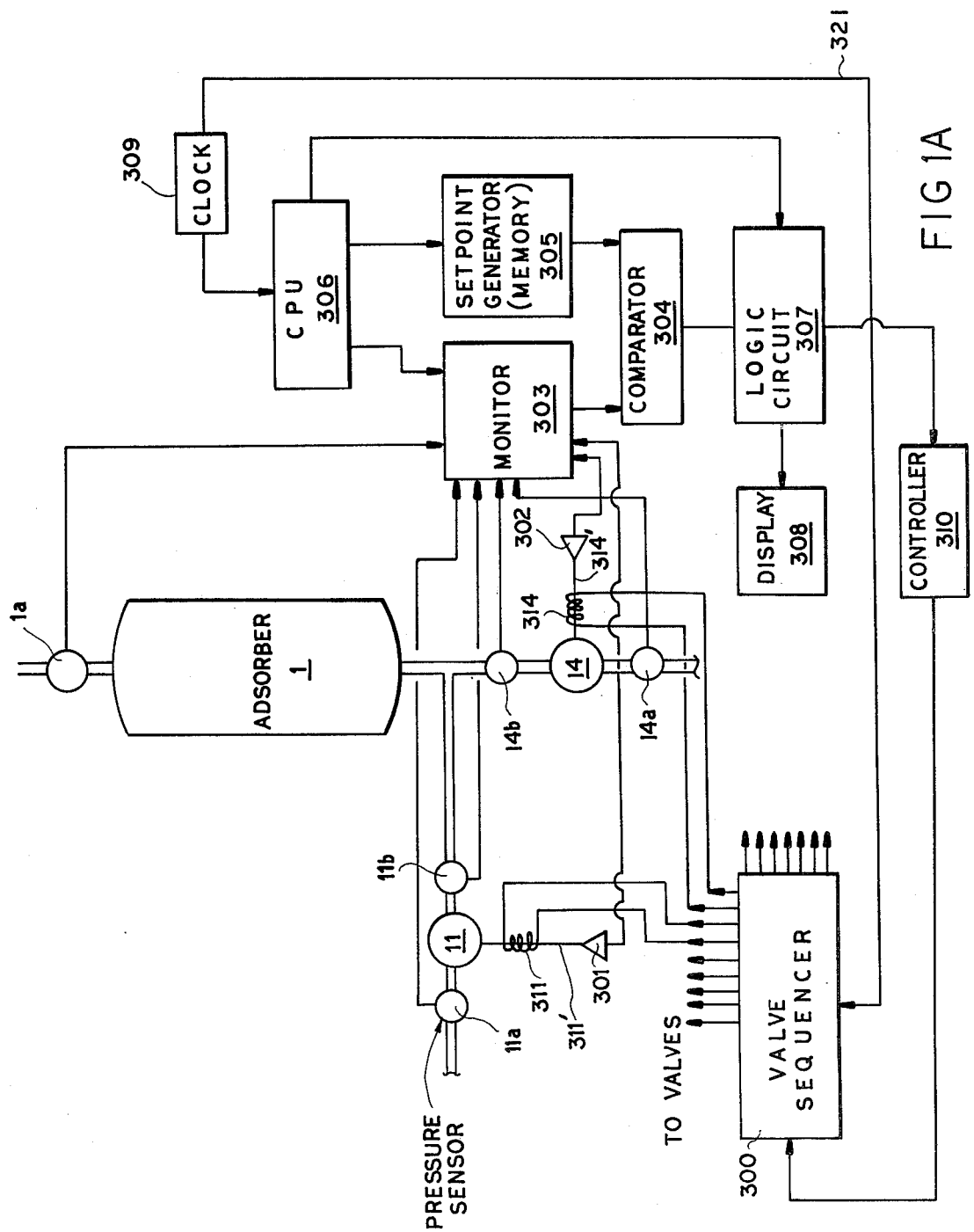

| Ads. Nr. | | | | | | | | | | | | | | | | | | |
|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 |
| 2 | 1 | 2 | 3 | 4 A | 5 | 6 | 7 E1 | 8 E2 | 9 E3 | 10 E4 | 11 E5 | 12 E6 | 13 S1 | 14 S2 | 15 B3 | 16 B2 | 17 B1 | 18 B |
| 3 | | 1 | | 2 | 3 | 4 A | 5 | 6 | 7 E1 | 8 E2 | 9 E3 | 10 E4 | 11 E5 | 12 E6 | 13 S1 | 14 S2 | 15 B3 | 16 B2 |
| 4 | 17 B1 | 18 B | | | 1 | 2 | 3 | 4 A | 5 | 6 | 7 E1 | 8 E2 | 9 E3 | 10 E4 | 11 E5 | 12 E6 | 13 S1 | 14 S2 |
| 5 | 15 B3 | 16 B2 | 17 B1 | 18 B | | | 1 | 2 | 3 | 4 A | 5 | 6 | 7 E1 | 8 E2 | 9 E3 | 10 E4 | 11 E5 | 12 E6 |
| 6 | 13 S1 | 14 S2 | 15 B3 | 16 B2 | 17 B1 | 18 B | | | 1 | 2 | 3 | 4 A | 5 | 6 | 7 E1 | 8 E2 | 9 E3 | 10 E4 |
| 7 | 11 E5 | 12 E6 | 13 S1 | 14 S2 | 15 B3 | 16 B2 | 17 B1 | 18 B | | | 1 | 2 | 3 | 4 A | 5 | 6 | 7 E1 | 8 E2 |
| 8 | 9 E3 | 10 E4 | 11 E5 | 12 E6 | 13 S1 | 14 S2 | 15 B3 | 16 B2 | 17 B1 | 18 B | | | 1 | 2 | 3 | 4 A | 5 | 6 |
| 9 | 7 E1 | 8 E2 | 9 E3 | 10 E4 | 11 E5 | 12 E6 | 13 S1 | 14 S2 | 15 B3 | 16 B2 | 17 B1 | 18 B | | | 1 | 2 | 3 | 4 A |
| 10 | 5 | 6 | 7 E1 | 8 E2 | 9 E3 | 10 E4 | 11 E5 | 12 E6 | 13 S1 | 14 S2 | 15 B3 | 16 B2 | 17 B1 | 18 B | | | 1 | 2 |
| 11 | 3 | 4 A | 5 | 6 | 7 E1 | 8 E2 | 9 E3 | 10 E4 | 11 E5 | 12 E6 | 13 S1 | 14 S2 | 15 B3 | 16 B2 | 17 B1 | 18 B | | |

| Ads.Nr. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 |
| 2 | 1/A | 2 | 3/A | 4 | 5/E1 | 6/E2 | 7/E3 | 8/E4 | 9/E5 | 10/E6 | 11/S1 | 12/S2 | 13/B3 | 14/B2 | 15/B1 | 16/B |
| 3 | 15/B1 | 16/B | 1 | 2/A | 3/A | 4 | 5/E1 | 6/E2 | 7/E3 | 8/E4 | 9/E5 | 10/E6 | 11/S1 | 12/S2 | 13/B3 | 14/B2 |
| 4 | 13/B3 | 14/B2 | 15/B1 | 16/B | 1 | 2/A | 3/A | 4 | 5/E1 | 6/E2 | 7/E3 | 8/E4 | 9/E5 | 10/E6 | 11/S1 | 12/S2 |
| 5 | 11/S1 | 12/S2 | 13/B3 | 14/B2 | 15/B1 | 16/B | 1 | 2/A | 3/A | 4 | 5/E1 | 6/E2 | 7/E3 | 8/E4 | 9/E5 | 10/E6 |
| 6 | 9/E5 | 10/E6 | 11/S1 | 12/S2 | 13/B3 | 14/B2 | 15/B1 | 16/B | 1 | 2/A | 3/A | 4 | 5/E1 | 6/E2 | 7/E3 | 8/E4 |
| 7 | 7/E3 | 8/E4 | 9/E5 | 10/E6 | 11/S1 | 12/S2 | 13/B3 | 14/B2 | 15/B1 | 16/B | 1 | 2/A | 3/A | 4 | 5/E1 | 6/E2 |
| 8 | 5/E1 | 6/E2 | 7/E3 | 8/E4 | 9/E5 | 10/E6 | 11/S1 | 12/S2 | 13/B3 | 14/B2 | 15/B1 | 16/B | 1 | 2/A | 3/A | 4 |

| Ads. Nr. | | | | | | | | | | | | | | | | | | | | | | | | |
|---|---|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 1 | 2 | 3 | 4 | 5 | 6 | 1 | 2 | 3 | 4 | 5 | 6 |
| 2 | 1 | 2 | 3 | 4/A | 5 | 6 | 7/E1 | 8/E2 | 9/E3 | 10/S | 11/B1 | 12/B | 1 | 2 | 3/A | 4 | 5 | 6 | | | 3/A | 4 | 5 | 6 |
| 3 | 11/B1 | 12/B | 1 | 2 | 3/A | 4 | 5 | 6 | | | 11/B1 | 12/B | 12/B | 11/B1 | 1 | 2 | 3/A | 4 | 12/B | 11/B1 | 1 | 2 | 3/A | |
| 4 | 9/E3 | 10/S | 11/B1 | 12/B | 1 | 2 | 3/A | 4 | 5 | 6 | 9/E3 | 10/S | 10/S | 9/E3 | 11/B1 | 12/B | 1 | 2 | 10/S | 9/E3 | 11/B1 | 12/B | 1 | 2 |
| 5 | 7/E1 | 8/E2 | 9/E3 | 10/S | 11/B1 | 12/B | 1 | 2 | 3/A | 4 | 7/E1 | 8/E2 | 8/E2 | 7/E1 | 9/E3 | 10/S | 11/B1 | 12/B | 8/E2 | 7/E1 | 9/E3 | 10/S | 11/B1 | 12/B |
| 6 | 5 | 6 | 7/E1 | 8/E2 | 9/E3 | 10/S | 11/B1 | 12/B | 1 | 2 | 5 | 6 | 6 | 5 | 7/E1 | 8/E2 | 9/E3 | 10/S | 6 | 5 | 7/E1 | 8/E2 | 9/E3 | 10/S |
| | 3/A | 4 | 5 | 6 | 7/E1 | 8/E2 | 9/E3 | 10/S | 11/B1 | 12/B | 3/A | 4 | 4/A | 3/A | 5 | 6 | 7/E1 | 8/E2 | 4/A | 3/A | 5 | 6 | 7/E1 | 8/E2 |

| Ads. Nr. | 1 | 2 | 3 | 4 | 5 | 6 | 7 | 8 | 1 | 2 |
|---|---|---|---|---|---|---|---|---|---|---|
| 1 | 1/A | 2/A | 3/E1 | 4/E2 | 5/E3 | 6/S | 7/B1 | 8/B | 1/A | 2/A |
| 2 | 7/B1 | 8/B | 1/A | 2/A | 3/E1 | 4/E2 | 5/E3 | 6/S | 7/B1 | 8/B |
| 3 | 5/E3 | 6/S | 7/B1 | 8/B | 1/A | 2/A | 3/E1 | 4/E2 | 5/E3 | 6/S |
| 4 | 3/E1 | 4/E2 | 5/E3 | 6/S | 7/B1 | 8/B | 1/A | 2/A | 3/E1 | 4/E2 |

Fig. 7

METHOD OF OPERATING A CYCLICAL PRESSURE-SWING ADSORPTION INSTALLATION

CROSS REFERENCE TO RELATED APPLICATION

This application is related to the commonly assigned copending application Ser. No. 076,359, filed Sept. 17, 1979 by Christian BENKMANN, one of the present joint inventors, now U.S. Pat. No. 4,259,091.

FIELD OF THE INVENTION

The present invention relates to a method of operating an adsorption plant or installation having a multiplicity of cyclically operated pressure-swing adsorbers, especially for the cleaning and rectification (component separation) of a gas or gas mixture.

More particularly the invention relates to the operation of a system having a multiplicity of adsorbers of the type which can be regenerated (discharge of adsorbed material) by changing the pressure within the adsorber gas. The invention is especially applicable to the operation of an adsorber system utilizing individual adsorbers which may be of the type disclosed in the aforementioned copending application which is hereby included by reference.

BACKGROUND OF THE INVENTION

From the aforementioned copending application it will be apparent that a process utilizing pressure-swing adsorbers for the cleaning and rectification of gases, especially utilizing a plurality of adsorbers, is known in the art with the important advantage that thermal regeneration of the adsorber gas is not required.

An installation for the purposes described can comprise a multiplicity of adsorbers which undergo, in each operating cycle, a predetermined number of adsorption phases, pressure-relief or pressure-equalization phases, purging phases and representation or pressure buildup phases.

For the cleaning and rectification of gases, especially the cleaning of natural gas or the rectification of noble or inert gases, air, sewer gases, cracking gases, hydrogen-rich gas mixtures or mixtures of gaseous hydrocarbons, it is a common practice nowadays to utilize adsorption processes because of the high economy and effectiveness.

In recent years, this field has seen an increased rate of growth because of the introduction of quasi-isothermal processes which are generally referred to as pressure-swing adsorption processes.

In these processes, the desorption or regeneration of the charged or loaded adsorption medium is not effected by an increase in temperature which must be followed by a cooling to the adsorption temperature, but rather exclusively by a reduction in pressure over the loaded adsorbent, i.e. a pressure relief of the adsorber, whereby the desorption stage is effected at least during its later phases by the passing of a purge gas through the medium.

It is also known, in this pressure-swing adsorption technique, to utilize the gas freed upon the pressure relieving of a loaded adsorber, more or less completely to increase the pressure (during respective pressure build-up phases) in other absorbers which have previously been brought to low-pressure levels by the respective pressure relief phases.

For example, German patent document (open application-Offenlegungsschrift) DE-OS 26 34 346 describes a process for the cleaning or rectification of an input gas mixture by pressure-swing adsorption units totaling nine in the installation. Each of these adsorbers is assigned six valves.

Following the adsorption phase at high pressure, each adsorber, in turn, undergoes a plurality of pressure-relief stages and the gas initially found in the interstices of the adsorption agent and later also adsorbed components, is withdrawn and in part used for pressurization of adsorbers which have been brought to their low pressure levels and must be repressurized.

The first pressure-relief stage is effected by connecting the adsorber in question with another adsorber already at the lower pressure level characterized by the first pressure-relief stage, i.e. by equalization of pressure between the two adsorbers. Naturally, the adsorber initially at the lower pressure thereby attains a higher pressure as part of its repressurization stage.

In this manner each pressure-relief stage and each repressurization stage can be effected by pressure equalization between adsorbers.

In the last pressure-relief stage, gas is withdrawn as residual gas and this pressure-relief stage can be followed by a counterflow purging of the adsorber to eliminate as best as possible the adsorbed components from the adsorptive medium.

The subsequent repressurization phases are then carried out from the most part by pressure equalization with other adsorbers at high pressure with the last repressurization stage effected to the adsorption pressure with product gas.

In such installations, the durations of the individual phases within a cycle may be of the order of seconds, while the total cycle between readiness for the adsorption phase to a repetition of such readiness, may be of the order of several minutes.

As a result of the high speed at which the pressures and gas flows must be changed over for the numerous phases of each cycle and between adsorbers, the system can be deemed to be under considerable stress. In other words, the high sequencing and alternation speeds place significant strain upon the operating members such as valves, and even static members such as conduits and fittings. The problem is increased by the practical requirement that the system operate without major replacement or modification for periods of up to ten years in a more or less continuous manner.

When such systems are constructed for long-term operation, it is found that despite the most effective choice of design, various failure problems arise primarily as a result of material fatigue or wear. As a result, adsorbers, valves and even the ducts connecting the adsorbers with one another, the valves with one another, or the adsorbers with the valves, can fail and result in detrimental conditions within the system manifested, for example, by pressure losses and leakage. For example, the valves, ducts or adsorbers may leak pressurized gas to the environment or valves may leak pressurized gas into unpressurized regions, etc.

In conventional installations of the aforedescribed type it is frequently required to bring the entire installation to standstill so that the components can be checked and tested, effects ascertained and failures replaced, repaired or modified before the system is again placed in operation. The downtimes which this approach necessitates are significant economic disadvantages but are even more detrimental than can be measured by the loss of operating time, since installations of the type described are frequently provided in adsorption systems in which the recovered fractions of the original or incoming gas must be obtained in substantially constant quantities practically continuously for other units making use of these fractions or for distribution to consuming installations.

OBJECTS OF THE INVENTION

It is, therefore, the principal object of the present invention to provide a method of operating a pressure-swing adsorber installation whereby the disadvantages of the earlier system mentioned above can be obviated and an improved operating efficiency and continuity obtained.

Another object of the invention is to provide an improved method of operating a multiadsorber pressure-swing adsorption system which permits rapid detection of a failure and repair or replacement without terminating the output of the installation in spite of the unavailability of normally operating components.

Yet another object of the invention is to provide an improved method of operating an adsorber system, utilizing pressure-swing adsorption techniques, which affords a continuous output notwithstanding possible failure of components of the system.

SUMMARY OF THE INVENTION

These objects and others which will become apparent hereinafter are attained in an improved method of operating a pressure-swing adsorber installation comprising a multiplicity of adsorbers capable of undergoing, in a given operating cycle, adsorption at an elevated pressure, a plurality of pressure relief stages and ultimate purging, and a repressurization phase, the installation having valves for selectively connecting the adsorbers so that at least in part the pressurization and pressure relief phases are effected by connecting each adsorber with one or more other adsorbers at higher or lower pressure levels in the respective cycles of operation.

According to the invention, the adsorbers and/or the valves of the pressure-swing adsorber installation are assigned measurable physical parameters which are continuously monitored and, upon the development of differences between setpoint values for these parameters and actual values thereof, a determination is made that a particular element (adsorber, valve, conduit length) is defective. The defective element of the apparatus is blocked and the operation of the remaining adsorbers is modified in such manner that the adsorbers in part are cycled through the respective phases and in part are held in certain phases with redistribution of the function of the isolated element until all of the remaining adsorbers can be cycled identically through corresponding phases, thereby maintaining the output continuity of the installation.

For carrying out the process of the present invention, each of the valves of the pressure-swing adsorption installation can be provided with a setting indicator which signals the position of the valve. If the signal setting does not coincide with the setpoint setting, an output signal is triggered to constitute a failure alert which can be used to automatically close off the defective element. The setting signaler thus clearly indicates a defective valve and has, therefore, an important advantage although it is not capable of signaling a valve failure in the form of leakage past the valve seat.

Such leakage failures are, of course, of a nature that their effects are readily noticeable although the failures themselves are difficult to ascertain since the valves usually communicate with adsorbers or ducts to which other adsorbers, valves and ducts connect and hence isolating a failure resulting from valve leakage has been difficult heretofore.

The system of the present invention enables even these failures to be rapidly detected and localized.

According to the invention, a sealing defect in a valve which results in a change in the pressures upstream and downstream of the seat of the expected values is provided with detectors for these upstream and downstream pressure stages respectively and these detectors provide signals which are compared with setpoint values.

Upon deviation from the setpoint value the location of the defective valve can be signaled.

According to the invention, these sensors are commutated or scanned by the monitoring system in the sequence and cadence of the valve operation or at a higher rate with the output being monitored by logic circuitry capable of discriminating individual failures from the collected data for all of the valves.

Since the system of the present invention monitors at least one physical parameter of each element which might be defective for the comparison with the setpoint value mentioned earlier, the scanning or commutating system may be used, together with appropriate logic circuitry, not only for the pressure upstream and downstream of each valve seat, but also for the other parameters, i.e. valve setting or parameters characteristic of effective adsorber operation.

For example, the parameters of adsorber operation may be a pressure in the adsorber, e.g. an absolute pressure, a pressure change (i.e. difference in pressure between phases) or a variation in pressure with time, depending upon the nature of the pressure-swing process and the pressure-monitoring means of available or desirable or whichever pressure measurement is most significant. Additionally, the difference between adsorption and desorption pressures is of importance in the type of measurement as well.

For example, it is possible to obtain a predetermined pressure change by automatic control of a valve within a predetermined time. In this case the pressure may be monitored in part by the change in valve setting with time or by monitoring the position of the valve at a predetermined point in the cycle.

Pressure-swing adsorption systems can also operate so that individual phase changes, i.e. valve alternations, do not occur in accordance with a predetermined time plot, but rather in accordance with a pressure plan. In this case valves switch over when the pressure in predetermined portions of the apparatus, for example in the adsorbers or their connecting ducts, attain predetermined values. Thus, since the valve characteristics are known, one can monitor the time until valve change-over or from a valve switchover and compare this with a setpoint value of the time. Here again the monitoring of a parameter, namely time, allows the pressure conditions to be ascertained and a defective state detected.

Thus, when reference is made to an operating parameter in the broad sense it must be understood that numerous process parameters are interdependent and that it is impossible to monitor any of them to control any other or determine whether a particular element of the system may be defective. Furthermore, the monitoring system may reflect simultaneous use of a plurality of parameters, generally time, valve position and pressure.

According to the invention, in a best mode thereof, the pressure-swing adsorber installation is operated in accordance with a predetermined time plan or schedule, i.e. switchover is effected at predetermined times during each cycle for each adsorber and the cycles of the multiplicity of adsorbers are synchronized with one another. In this case it has been found to be especially advantageous to use the pressure in the adsorbers and/or in the conduits connected thereto as the physical parameter to be monitored and as the basis for detecting defective valves.

In principle, a valve which has lost its seal can result in higher or lower pressures than the setpoint pressure. Thus when actual or measured pressure exceeds the setpoint pressure for the precise point in time or monitoring procedures, a defective valve is signaled for all valves which are disposed between the measuring location or the adsorber at which the pressure is measured and all apparatus elements at which a higher pressure prevails.

Naturally, when the deviation from the setpoint value is downward, a defective valve is signaled for any value which is disposed between the measuring location and apparatus elements at which a lower pressure prevails.

By monitoring the pressure in successive phases of the same or associated adsorber and in other adsorbers which from time to time are connected with the adsorber monitored as described, a comaprison between actual value and setpoint value can be made over a portion of a cycle or several cycles to enable detection and isolation of the single defective valve causing the deviation from the setpoint value in either direction.

BRIEF DESCRIPTION OF THE DRAWING

The above and other objects, features and advantages of the present invention will become more readily apparent from the following description, reference being made to the accompanying drawing in which:

FIG. 1A is a block diagram illustrating a monitoring system which can be used in accordance with the present invention;

FIGS. 2 and 3 are sequence diagrams illustrating the various modes of operation of the adsorbers of FIG. 1;

FIGS. 5–7 are timing diagrams showing the sequencing relationships for various aspects of the operation of the system of FIG. 4.

SPECIFIC DESCRIPTION AND EXAMPLES

Figure 1:
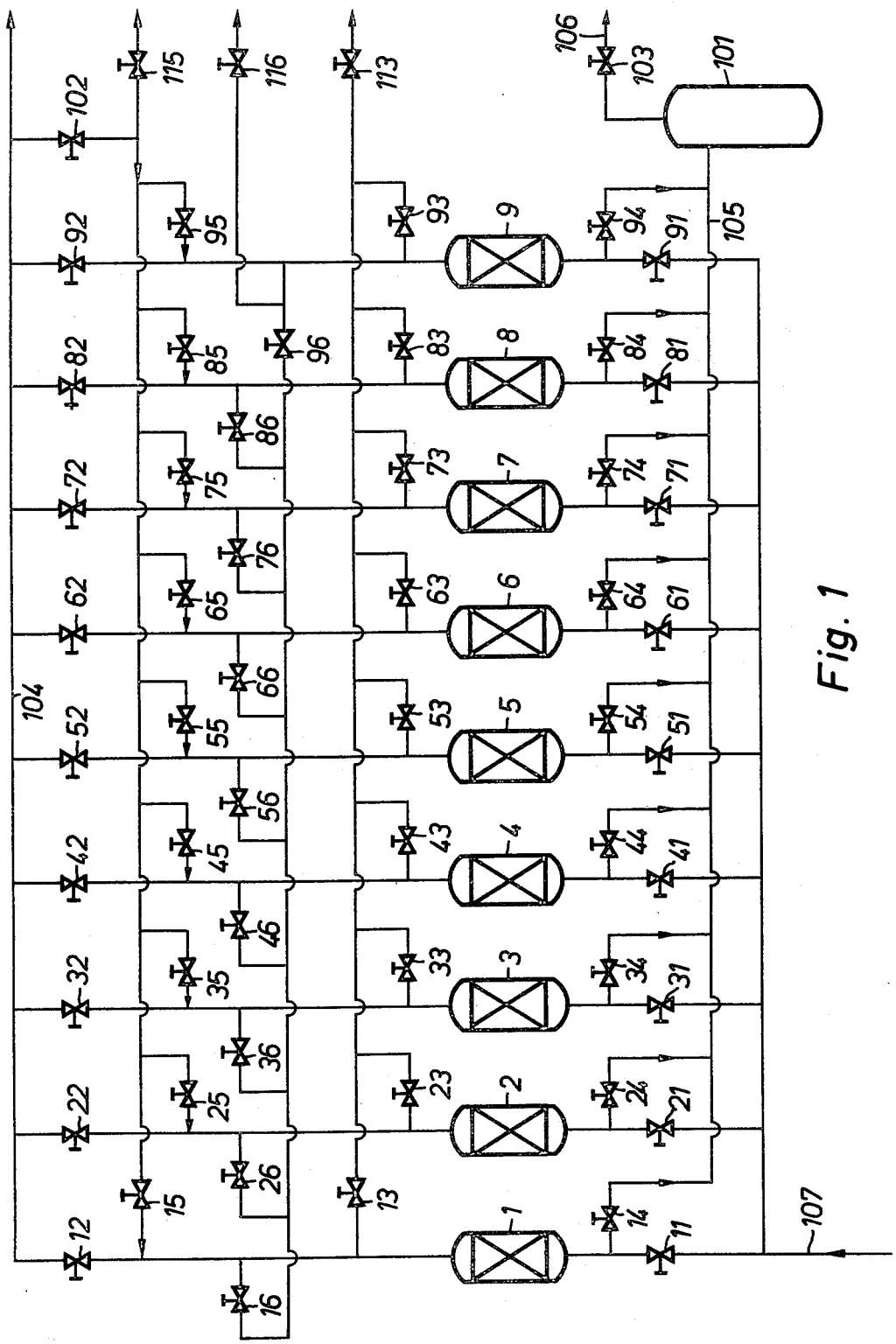
FIG. 1 is a plant schematic of a pressure-swing adsorber installation having nine adsorbers operated in accordance with the method of the present invention, the associated valves and the conduits thereof in accordance with the present invention.
Figure 4:
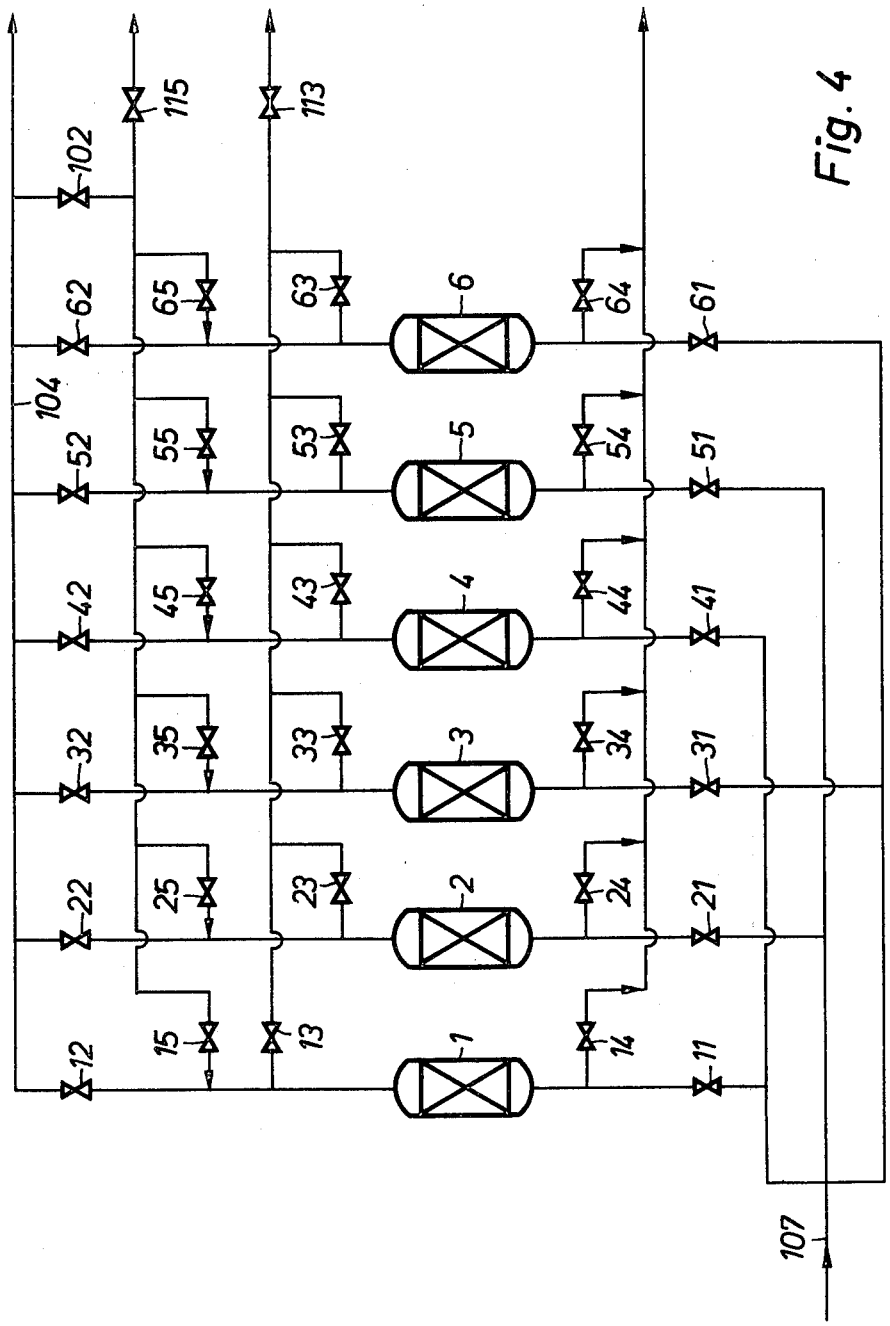
FIG. 4 is a diagram similar to FIG. 1 of a six-adsorber system in accordance with the invention.

In the following description, reference will be had to FIGS. 1 and 4 showing pressure-swing adsorption plants with nine and six adsorbers respectively and illustrating how, upon defect or failure of one of the adsorber elements, or more, the system compensates to maintain continuity of output.

For convenience, similar reference numerals have been used in both Figures and naturally identical reference numerals refer to identically functioning parts.

For each adsorber assigned a single-digit reference numeral 1, 2, etc. the associated valves have been designated by two-digit members with the first digit corresponding to the adsorber number in question. Thus the valves associated with an adsorber 1 are valves 11, 12, 13, 14, 15, 16 and the valves associated with adsorber 2 are 21, 22, 23, 24, 25, 26, etc. Ancillary valves have been given hundreds numerals.

FIG. 1A is applicable to the system of FIGS. 1–4 and generally illustrates the monitoring principles involved.

FIG. 1A, more particularly, shows a possible monitoring system in accordance with the invention, it being understood that any conventional commutating, pressure-monitoring or time arrangement may be used.

In the embodiment illustrated, however, a valve sequence 300 is shown to be connected to each of the valves of the pressure-swing adsorber installation, only valves 11 and 14 being shown in FIG. 1A for the adsorber 1. Like the other valves in the system, these valves are electromagnetically or servo-actuated as represented by the coils 311 and 314 which act upon diagrammatically illustrated armatures or valve members 311' and 314', respectively. Each of the valve members can be connected to a position sensor 301, 302, e.g. in the form of a linear differential transformer whose output can be digitalized by any conventional means (see SERVOMECHANISM PRACTICE, McGraw-Hill Book Co., New York, N.Y., 1960, pp 44ff) to provide inputs to the monitoring circuit 303. The latter can be any conventional commutator or distributor system feeding a single actual-value signal to a comparator 304 for comparison with a corresponding setpoint signal from a setpoint monitor or memory 305, the monitor and memory being addressed by the central processor 306 (see chapter 4, pp 453 etc. of *HANDBOOK OF TELEMETRY AND REMOTE CONTROL*, McGraw-Hill Book Co., New York, N.Y. 1967). In other words, each position of each valve member is monitored sequentially and compared with the associated setpoint value, predetermined for the process relationship, with the comparator 304 feeding the result into the logic circuitry 307 for display at 308 of the value identification for any valve whose setting deviates from the associated setpoint value.

As pointed out in the *HANDBOOK OF TELEMETRY AND REMOTE CONTROL* (op. cit.), the CPU 306 can be controlled by a clock 309, i.e. a clock pulse generator, assuring synchronization of the detection and the comparison and the operation of the logic circuit to display the appropriate defective valve. Naturally, the logic circuit 307 can also operate the controller 310 to cut out a defective portion of the adsorber installation and the valve sequence 300 which, via line 321, is also synchronized by the clock 309.

In addition to the valve-position detectors, each valve 11, 14 . . . is flanked by a respective pair of pressure sensors 11a, 11b; 14a, 14b; . . . which are digitalized pressure-electrical transducers whose output signals are delivered to the monitor 303 for comparison in the appropriate sequence coordinated with the valve switchovers, with setpoint values from unit 305. Here again any defect in a particular valve is ascertained by comparing the high-pressure and low-pressure values on opposite sides of a closed valve with the appropriate setpoint values at any predetermined point in time of the operation of the apparatus.

A further pressure sensor 1a, which may be the same as a valve-flanking pressure sensor, can have its output connected to the monitor to provide a signal representing the actual pressure in the respective adsorber. Here again a setpoint value stored which is recalled from the memory and compared with the assigned actual pressure value of the adsorber appropriate to the particular point in the operating sequence for indicating on the display 308 any adsorber failure.

Whether the failure is an adsorber failure or a valve failure or a dust failure, the faulty unit can be cut out of the system by triggering appropriate valves automatically or manually.

FIG. 1 shows a nine-adsorber system in accordance with the present invention with a normal operating scheme represented by the sequence diagram of FIG. 2.

Crude gas is delivered via line 107 to the adsorber 1 with valve 11 open so that the more readily adsorbed components are retained on the adsorbent medium while the less readily adsorbed components pass through the adsorber via valve 12 and are discharged through line 104 as a product gas.

At the end of the adsorption phase, the crude gas is switched to another adsorber, in the embodiment illustrated to the adsorber 4, and the pressure in adsorber 1 is reduced to a first intermediate pressure E(1). In FIG. 2, the operating cycle for each adsorber is shown to occupy 18 time frame periods or slots, the first six of which are occupied by the adsorption phase which is followed by the 7th time stage in the form of a reduction in pressure to the first intermediate level E1 in the seventh time stage. This reduction in pressure to the first intermediate level E1 is effected by pressure equalization with the adsorber 5 upon the opening of the valves 15 and 55.

Thereafter, the pressure in adsorber 1 is dropped to a second intermediate pressure (E2) by pressure equalization with adsorber 6 via valves 16 and 66 and then to a third intermediate pressure (E3) by pressure equalization with adsorber 7 via valves 16 and 76. During this pressure reduction in adsorber 1, the pressures in adsorbers 5, 6 and 7 are respectively raised to higher levels B1, B2 and B3 in the 7th, 8th and 9th time stages.

Thereafter, the pressure in adsorber 1 is dropped further in the fourth pressure-relief stage E4 by opening valves 13, 83, 84. At this point, the gas from the adsorber 1 flows through the adsorber 8 as a purging or sparging gas for the latter adsorber which is in its final stages of desorption. For the adsorber 8, therefore, this corresponds to the purging phase S2 in the 10th time frame of the adsorber cycle illustrated in FIG. 2. The resulting gas mixture of purged gas and desorbed components, passes via line 105 into the pressure-compensating and equalizing vessel 101.

In the 11th time frame of the adsorber 1 (j=11), valves 83 and 84 close and valves 93 and 94 open to establish the 5th pressure-relief phase E5 in which gas from the interstices of the adsorption medium in adsorber 1 passes as an initial purging gas through the adsorber 9 (purging stage S1) before flowing into line 105. Both purging stages are effected by passing the purging gas in counterflow to the passage of the gas during the adsorption stage.

In the 12th time frame, valves 13, 93 and 94 close and any residual gas in adsorber 1 is vented through valve 14 as a residual gas into the vessel 101 to complete the depressurization of the adsorber 1 (stage E6) and prepare the adsorber for the purging.

In the 13th time frame, the initial purging S1 is carried out by connecting adsorber 1 with adsorber 2 which is still under an elevated pressure (in its stage E5 as the diagram of FIG. 2 shows, corresponding to its time frame j=11) via opened valves 23, 13 and 14. The purge gas and sparged desorbed gas flows via line 105 into the vessel 101.

In the 14th time frame the adsorber 1 undergoes 2nd stage purging S2 by closure of valve 23 and opening of valve 33, so that adsorber 1 receives the purge gas in the counterflow direction from adsorber 3 which is then in its 4th expansion stage E4 and its tenth time frame. Again the purged gas is discharged into vessel 101.

The purging stage is followed by a repressurization stage of our phases.

More specifically, in the 15th time frame of the cycle of adsorber 1, valve 14 is closed and valves 46 and 16 are opened to equalize pressure between adsorber 4 in its third pressure relief stage E3 which corresponds to the first repressurization stage B3 of adsorber 1.

In the 16th time frame, adsorber 1 is brought to the 2nd pressurization stage B2 by closure of valve 46 and opening of valve 56 to relieve the pressure in adsorber 5 (corresponding to its 2nd pressure relief stage E2) by pressure equalization with adsorber 1.

The 17th time frame results in a pressure equalization between adsorber 1 for its third repressurization phase B1, via open valves 65 and 16, with the adsorber 6 in its initial pressure relief stage E1, valve 56 being closed.

The last pressure increase to the stage B of adsorber 1 is effected to product gas at the adsorption pressure branched off from line 104 by opening the valves 102 and 15. Adsorber 1 is thus ready for a new adsorption cycle of the 18th time frame and phases just described.

The above-described program of valve operations results from the programming of the valve sequencer 300 and the control of the clock 309 and can be effected automatically.

The adsorber numbers are given along the ordinate in the diagram of FIG. 2 and for a given reference time frame 1-18 along the upper horizontal row of the table of this figure, the corresponding phases are given together with the time frame number from 1-18 starting with 1 for the commencement of the cycle of each adsorber. FIGS. 3 and 5 through 7 are diagrams similar to FIG. 2, except that the diagrams of FIGS. 5 through 7 relate to the operation of the six adsorber system of FIG. 4.

From FIG. 2 it will be apparent that three adsorbers are continuously in an adsorption phase although offset from one another by two time frames so that at any point in time each adsorber only receives one third of the crude gas which is being processed. The output is, however, continuous.

Naturally each of the adsorbers is normally sequenced as has been described for adsorber 1. The only difference between the sequencing of adsorber 1 and adsorbers 2 through 9 is a time offset as the diagram of FIG. 2 shows.

In the example of FIG. 1, nine adsorbers are used in the absence of a defect or failure, the adsorption stage being effected over six time slots of the cycle and the pressure relief being effected over six time slots and in six distinct pressure stages E1-E6. The purging requires two time slots or phases S1 and S2 and the repressurization stages are four in number, namely, B3, B2, B1 and B, respectively. To demonstrate the principles of the invention, adsorber 9 is assumed to fail or to be cut out from the system with a revision in the sequencing as represented in FIG. 3.

It is thus possible to define the system in terms of its phase number j which can be calculated as follows:

$$j = T - 2(i-1)$$

in which T is the number of time slots or phases (eighteen in the case of FIG. 2 and sixteen in the case of FIG. 3) and i is the number (in order) of the adsorber of the sequence. For example, i is the adsorber number in FIGS. 2 and 3 since the nine adsorbers of FIG. 2 and the eight adsorbers of FIG. 3 are operated in their numbered sequence.

The maximum number of time slots or phases is calculated as follows:

$$T_{MAX} = 2n_A + 2m = 2n$$

where
n = the number of adsorbers,
$n_A$ is the number of adsorbers simultaneously operating in an adsorption stage and
m is the number of pressure stages $E_1 \ldots E_m$.

Associated with each phase number j is a pressure characteristic $p_j$ which is a predetermined pressure level. For the apparatus of FIGS. 1 and 2 with nine adsorbers, the following relationship of phase number and pressure characteristic can be established (pressure characteristic ranging from 0, representing no elevated pressure, to 6 representing the maximum pressure):

TABLE 1

| PHASE NUMBER | PRESSURE CHARACTERISTIC | PHASE DESIGNATION | PHASE DESCRIPTION |
|---|---|---|---|
| j = 1 | $p_j = 6$ | A | 1. Adsorption |
| j = 2 | $p_j = 6$ | A | 2. Adsorption |
| j = 3 | $p_j = 6$ | A | 3. Adsorption |
| j = 4 | $p_j = 6$ | A | 4. Adsorption |
| j = 5 | $p_j = 6$ | A | 5. Adsorption |
| j = 6 | $p_j = 6$ | A | 6. Adsorption |
| j = 7 | $p_j = 5$ | E1 | 1. Pressure Relief |
| j = 8 | $p_j = 4$ | E2 | 2. Pressure Relief |
| j = 9 | $p_j = 3$ | E3 | 3. Pressure Relief |
| j = 10 | $p_j = 2$ | E4 | 4. Pressure Relief |
| j = 11 | $p_j = 1$ | E5 | 5. Pressure Relief |
| j = 12 | $p_j = 0$ | E6 | 6. Pressure Relief |
| j = 13 | $p_j = 0$ | S1 | 1. Purging |
| j = 14 | $p_j = 0$ | S2 | 2. Purging |
| j = 15 | $p_j = 2$ | B3 | 1. Repressurization |
| j = 16 | $p_j = 3$ | B2 | 2. Repressurization |
| j = 17 | $p_j = 4$ | B1 | 3. Repressurization |
| j = 18 | $p_j = 5$ | B | 4. Repressurization |

As can be seen from FIG. 1, each adsorber is associated with six valves, namely, three valves for pressure equalization and one valve each for crude gas entry, product gas discharge and residual gas venting. The valves are opened by sequencer 300 in the following relationship:

TABLE 2

| VALUE | FUNCTION | OPENING AT j = |
|---|---|---|
| Vi1, Vi2 | Crude gas inlet/product gas outlet | 1 to 6 |
| Vi3 | Pressure relief/purging | 10, 11, 13 and 14 |
| Vi4 | Venting residual gas/purging | 12, 13 and 14 |
| Vi5 | First pressure relief/third equalization and product feed | 7, 17 and 18 |
| Vi6 | Second and third relief/first and second equalization | 8, 9, 15 and 16 |

(i = number of adsorber)

The valves Vi1–Vi6, of course, are correlated with the correspondingly numbered valves 1 through 6 of each adsorber, i.e. the valves 11–6 of adsorber 1 and the valves 71–76 of adsorber 7 by way of example.

As can be seen from Table 1, for the adsorber 1 of FIG. 1, with the slots T over 1-18, the following pressure characteristics $P_j$ apply:

TABLE 3

| T | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| $p_j$ | 6 | 6 | 6 | 6 | 6 | 6 | 5 | 4 | 3 | 2 | 1 | 0 | 0 | 0 | 2 | 3 | 4 | 5 |

Correspondingly, the operation of the valves must provide after valve pressures represented by the pressure characteristics $p_v$ as represented in Table 4:

TABLE 4

| T | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Vi1, 2 | 6 | 6 | 6 | 6 | 6 | 6 | 6 | 6 | 6 | 6 | 6 | 6 | 6 | 6 | 6 | 6 | 6 | 6 |
| Vi3 | 1 | 2 | 1 | 2 | 1 | 2 | 1 | 2 | 1 | 2 | 1 | 2 | 1 | 2 | 1 | 2 | 1 | 2 |
| Vi4 | 0 | 0 | 0 | 0 | 0 | 0 | 0 | 0 | 0 | 0 | 0 | 0 | 0 | 0 | 0 | 0 | 0 | 0 |
| Vi5 | 5 | 5 | 5 | 5 | 5 | 5 | 5 | 5 | 5 | 5 | 5 | 5 | 5 | 5 | 5 | 5 | 5 | 5 |
| Vi6 | 3 | 4 | 3 | 4 | 3 | 4 | 3 | 4 | 3 | 4 | 3 | 4 | 3 | 4 | 3 | 4 | 3 | 4 |

It will be seen from the foregoing that each valve at each phase of the pressure swing cycling of the respective adsorber is associated with a characteristic discernible pressure which will deviate from the predetermined pressure if the valve leaks or is defective.

A defect in the sealing of the valve produces a pressure differential between the valve after pressure (characteristic $p_v$) and the valve forward pressure (i.e. the adsorber pressure represented by the pressure characteristic $p_j$), which are directly measurable, e.g. with the system of FIG. 1A, to indicate a pressure deviation from the set point value at the end of each phase. The monitoring system can be sequenced so that these deviations are detected only for those phases or time slots in which a pressure equalization occurs between two closed volumes (for example at j=7, 8, 9, 15, 16 and 17).

The pressure differential $\Delta_p$ at a valve is defined by $$\Delta_p = pv - pj.$$

When a failure arises $\Delta_p$ deviates from 0 with $\Delta_p$ being greater than 0 when gas flows into an adsorber through a leaking valve and is negative when gas flows out of the adsorber through the leaking valve.

The pressure deviations from 0 can of course represent a defect in any one of a number of valves at any particular point in the operation of the system. To localize the defective valve, therefore, it is necessary to monitor the operation for a given adsorber over at least a number of phases of the cycle, using, for example, a particular adsorber as a reference with which the monitored adsorber is connected in pressure equalization. Naturally, any adsorber at any point in the monitoring can be the reference adsorber and the choice of the two adsorbers for the reference and test purposes can be made from the diagram of FIG. 2 which shows the adsorbers connected for pressure equalization in accordance with the sequencing program previously described.

The detection of a failure is exemplified by the following:

EXAMPLE 1

In an apparatus as shown in FIG. 1 using the time sequencing of the valves and adsorbers represented in FIG. 2 with six pressure stages (m=6) a low pressure is detected in time slots 7. In other words a detector system of the type shown in FIG. 1A has at its pressure sensor 1a a pressure value which is less than the corresponding set point pressure from the set point generator 305 so that the comparator 304 signals this effect. In the sense of the previous definition, this deviation is of a negative value.

To identify the defective valve which has brought about this negative deviation, the following considerations apply:

From Table 3 it is apparent that the adsorber 1 at j=7 should have a pressure characteristic $p_j=5$. The possible failure of one of the valves associated with adsorber 1 can only lie in a valve having a pressure characteristic $p_V$ less than 5. From Table 4, for the time slot 7, this is the case for valves Vi3, Vi4 and Vi6, i.e. valves 13, 14 and 16 in the case of adsorber 1. This applies, of course, also to the valves associated with the adsorber which is brought into pressure equalization in time slot 7 with the adsorber 1, namely, adsorber 5 (see FIG. 2).

The pressure stage $j_E$ in which the adsorber 5 is found upon pressure equalization with adsorber 1 can be calculated by the previous equations or can be read directly from FIG. 2 and the present case $j_E=17$.

From Table 4 it is apparent that in time slot 17 valves Vi3, Vi4 and Vi6 have a pressure characteristic $p_V$ below 5. Thus the possible failure can also be found in valves 53, 54 or 56.

In the cycling of these possibly defective valves, there are those which are connected with pressure relief ducts (for example the valves Vi5) and those which are associated with adsorbers which are in time slot 7 of adsorber 1 for a lower pressure characteristic $p_j$ than 5. This can be determined, of course, by calculation or from FIG. 2.

For adsorber 2, for example, in the time slot T=7, i=2, the phase number j is 5 so that the pressure characteristic $p_j$ equals 6 for this adsorber as can be ascertained from Table 1. This means that the valves of adsorber i are not defective.

The logic circuitry makes corresponding comparisons for all of the adsorbers and from these comparisons it can be shown that the additional valves 65, 75, 85 and 95 might possibly be defective. Thus the defective seal resulting in the fall of the pressure in adsorber 1 below its set point value must be found in one of the valves 13, 14, 16, 53, 54, 56, 65, 75, 85 and 95.

With further cycling of adsorber 1, corresponding calculations are made and the number of possible valve failures is reduced, i.e. the list is progressively narrowed, especially when the negative deviation turns into a positive deviation with further cycling. For example, if in time slot 17 the adsorber 1 develops a higher pressure than its set point value (positive deviation) a list of possible valve failures can be derived analogously to the foregoing.

The pressure characteristic of adsorber 1 in time slot 17 from Table 3 is p=4. If a positive deviation is detected, all valves are suspect which have a pressure characteristic $p_V$ greater than 4. From Table 4 these can be seen to be valves Vi1, Vi2 and Vi5. Valve Vi5 is immediately eliminated because during this phase it is open so that suspect valves are only valves 11 and 12.

During this phase, moreover, the adsorber 1 is in pressure equalization with adsorber 6, rendering valves 61 and 62 suspect and since the pressure relief duct is connected via open valve Vi5 and is used by adsorbers 7, 8 and 9 simultaneously, valves 75, 85 and 95 are also suspect.

The suspect list is thereby narrowed to valves 75, 85 and 95 since only these valves appear in the lists obtained with both positive and negative deviations.

To determine which of these three valves is defective, the pressures are monitored in the other adsorbers and, for example, it can be determined by a positive deviation of the pressure in adsorber 9 in its time slot 8 that valve 95 is defective.

This method of eliminating nondefective valves or ascertaining the defective valve from the suspect sets can be summarized as follows:

First negative deviation in adsorber 1 in time slot 7, suspect values: 13, 14, 16, 53, 54, 56, 65, 75, 85, and 95.

First positive deviation in adsorber 1 in time slot 17, suspect valves: 11, 12, 61, 62, 75, 85 and 95.

First positive deviation in adsorber 9 in time slot 8, suspect valves: 91, 92, 51, 52, 95, 55, 16, 26, 36 and 46.

The defective valve is thus clearly identified as 95 since only this valve is present in all three sets.

The method of the present invention for determining the failure in any system of n adsorbers can be carried out automatically by a special purpose computer whose memory contains the tables and the set point values with any suspect valves being registered from cycle to cycle and the final determination made by logic circuitry through conventional AND gates selecting the common member of all suspect sets.

Once the defective valve is identified, the adsorber associated therewith is cut off from the system by closing all of its associated valves and by closing manual valves which can be provided as ancillary shutoff devices although these valves have not been shown in the drawing. This naturally eliminates any further problem with the defective valve.

With an adsorber installation having n adsorbers of which nA are simultaneously operating in the adsorption stage and wherein m pressure stages are provided, the total number of time slots or phases is given by the relationship $T=2n_A+2m$ as previously stated. The time slot number for an adsorption phase is $2n_A$.

When, as a result of the cut out of one or more adsorbers, e.g. a total of x adsorbers, the new phase count or number of time slots $T=2n_A+2m-2x$. Thus if the number of pressure stages m is retained, the maximum number of adsorbers which can be cut out while retaining continuity of operation is $n_A-1$. To permit the same gas flow to be cleaned, the adsorption stage must be reduced to $2(n_A-x)$ time slots.

The product yield is dependent upon the number of pressure stages m. With shutdown of x adsorbers without changing the number of pressure stages m, the installation can have the same product yield as with the full number of adsorbers. Furthermore, with the adsorption time reduced as noted, the original output of the product gas can be maintained, of course with a more rapid cycling.

Upon blocking of a defective adsorber and the modification of the time slot number in accordance with the new sequence, the following steps are taken:

1. The faulty adsorber is isolated or blocked by closing all of its associated valves as illustrated and, in addition, by additional manual valves.

2. Upon cut out of the absorber i in a time slot j of even numbers, all of the adsorbers of numbers up to $i+j_2=1$ are operated two further time slots in their original program and, when j is an odd number, the adsorbers up to $$i + \frac{(j+1)}{2} - 1$$

are operated two further time slots or phases in their original program.

All other adsorbers are held in their time slots or phases at which they were at the time of detection and blockage of the defective adsorber i. After these two time slots or phases, all of the adsorbers are operated with the new sequence which can be established by automatic programming of the valve sequencer.

During the resynchronization operation, pressure equalization or transfer betwen two adsorbers is normally carried out but for those adsorbers which are temporarily inactive or are to be subject to maintenance, gas can be vented by additional valves at respective vent ducts.

3. The volume of the crude gas per adsorber to be cleaned is kept the same as its original value during the two synchronization time slots and thereafter is raised by a factor $$\frac{n_A}{n_A - x}$$

so that the installation has the original product output.

To minimize loss of the product it is possible even during the two synchronization time slots to increase rate of feed of the crude gas to the adsorbers, especially when the latter are operating at less than peak capacity. The maximum product loss, however, extends only over four time slots.

The following examples are illustrative of these points:

EXAMPLE 2

With a pressure swing adsorption installation having nine adsorbers as shown for example in FIG. 1 and the sequencing of FIG. 2, a failure of a valve function is detected in adsorber 1 in time slot 9.

Adsorber 1 is cut out of the system and the installation is resequenced for eight adsorbers, This resequencing has been illustrated in FIG. 3 and, as is apparent, has only two adsorbers simultaneously in adsorption stages. The number of adsorption time slots is reduced from 6 to 4.

In the following Table 5, the time slot numbers of the individual adsorbers are given with the second column representing the state upon cut out of adsorber 1. The third and fourth columns show the synchronization process and the fifth column the resynchronized process which represents the starting point of the eight adsorption program of FIG. 3.

TABLE 5

| Ads. No. | Nine-adsorber Program | | | Eight-Adsorber Program |
|---|---|---|---|---|
| | Phase No. | Phase No. | Phase No. | Phase No. |
| 1 | 9 | — | — | — |
| 2 | 7 | 8 | 9 | 7 |
| 3 | 5 | 6 | 7 | 5 |
| 4 | 3 | 4 | 5 | 3 |
| 5 | 1 | 2 | 3 | 1 |
| 6 | 17 | 17 | 17 | 15 |
| 7 | 15 | 15 | 15 | 13 |
| 8 | 13 | 13 | 13 | 11 |
| 9 | 11 | 11 | 11 | 9 |

The relief gases of adsorber 2 in time slots 7 and 8 during the synchronization are vented via the additional valve 115, 116 (FIG. 1) since the corresponding adsorbers 6 and 7 (erstwhile time slots 17 and 16, respectively) are retained against sequencing.

EXAMPLE 3

Figure 6:
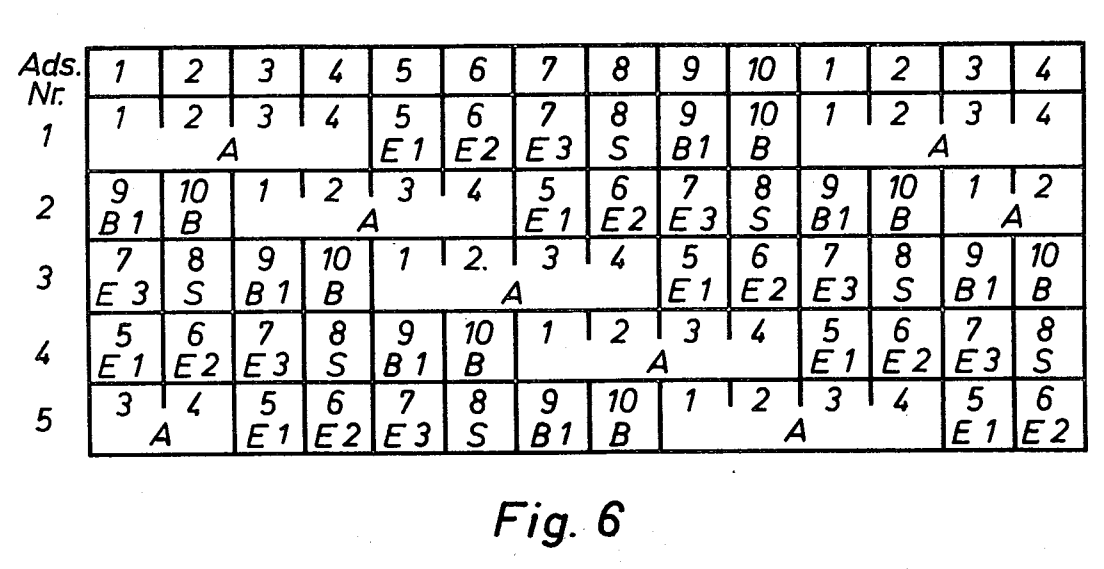

A six adsorber set up is shown in FIG. 1 for a pressure change adsorption installation. This system is operated in accordance with the sequence diagram of FIG. 5. If it is assumed that a failure occurs of a valve in time slot 8, the resulting adsorber is cut out and the system is resequenced for five adsorbers as shown in FIG. 6. The synchronization is represented in Table 6.

TABLE 6

| Ads. No. | Six-Adsorber Program | | | Eight-Adsorber Program |
|---|---|---|---|---|
| | Phase No. | Phase No. | Phase No. | Phase No. |
| 1 | 8 | — | — | — |
| 2 | 6 | 7 | 8 | 6 |
| 3 | 4 | 5 | 6 | 4 |
| 4 | 2 | 3 | 4 | 2 |
| 5 | 12 | 12 | 12 | 10 |
| 6 | 10 | 10 | 10 | 8 |

The vented gas from adsorber 2 passes via valve 115 at time slot 7 (see FIG. 4).

EXAMPLE 4

The apparatus shown in FIG. 4 with six adsorbers has failures of adsorbers 2 and 3 in time slots 9 and 7, respectively. The result is a resequencing for four adsorbers as shown in FIG. 7. The synchronization process is illustrated in Table 7 and takes twice the number of time slots as the previous resynchronization.

TABLE 7

| Six-Adsorber Program | | | | Five-Adsorber Program | | | Four-Adsorber Program |
|---|---|---|---|---|---|---|---|
| Phase No. | Phase No. | Phase No. | Phase No. | Phase No. | Phase No. | Phase No. | Phase No. |
| 1 | 11 | 11 | 11 | 9 | 9 | 9 | 7 |
| 2 | 9 | — | — | — | — | — | — |
| 3 | 7 | — | — | — | — | — | — |
| 4 | 5 | 6 | 7 | 5 | 6 | 7 | 5 |

TABLE 7-continued

| Six-Adsorber Program | | | | Five-Adsorber Program | | | Four-Adsorber Program |
|---|---|---|---|---|---|---|---|
| Phase No. | Phase No. | Phase No. | Phase No. | Phase No. | Phase No. | Phase No. | Phase No. |
| 5 | 3 | 4 | 5 | 3 | 4 | 5 | 3 |
| 6 | 1 | 2 | 3 | 1 | 2 | 3 | 1 |

We claim:

1. A method of operating a multi-adsorber pressure swing adsorber installation which comprises a multiplicity of adsorber elements and respective duct elements and valve elements interconnecting said adsorber elements and sequenced to operate said adsorbers sequentially and to cycle each adsorber through an adsorption stage at an elevated pressure for a plurality of time slots into which the cycle is divided, through at least one pressure-relief phase over at least one corresponding time slot by pressure equalization with other adsorbers, through at least one purging phase by connection to another adsorber and through at least one pressure buildup phase with such pressure equalization, said method comprising the steps of:

monitoring a physical parameter of the operation of at least some of said elements of each adsorber over the cyclical operation of said adsorbers and comparing the monitored physical parameter with a setpoint value thereof corresponding to the respective point in the sequence to detect a defective one of said elements sustaining an apparatus failure;

isolating the adsorber associated with the defective element from the remainder of said installation and removing the isolated adsorber from service; and modifying the number of operating phases and time slots per cycle of the adsorbers remaining effective in said installation corresponding to the number os such adsorber remaining effective by continuing the cycling of some of the adsorbers while temporarily interrupting the cycling of other adsorbers, to establish a new sequence corresponding to the number of remaining adsorbers without interrupting the input and output of the installation.

2. The method defined in claim 1 wherein said physical parameter which is monitored is the pressure of at least one element associated with each adsorber.

3. The method defined in claim 1 wherein the physical parameter which is monitored for at least some of said elements is the time to attainment of a predetermined pressure.

4. The method defined in claim 1 wherein the physical parameter which is monitored is the setting of one of said valve elements for each adsorber.

5. The method defined in claim 4 wherein the physical parameter which is measured is the displacement of a valve member as a function of time.

6. The method defined in claim 1 wherein the pressure in each adsorber is monitored for each phase of the cycle thereof and compared with a respective setpoint value at each phase, a deviation between the monitored pressure and the setpoint value being registered only upon its initial appearance.

7. The method defined in claim 6 wherein a positive deviation and a negative deviation of a measured pressure value from respective setpoint values are ascertained during a cycle of a given adsorber to detect respective sets of suspect valves for each deviation, the sets being correlated to indicate the faulty valve resulting in such deviations.

8. The method defined in claim 1 wherein each of the adsorbers in the installation is assigned a number from 1 to n in the sequence in which the respective adsorbers are cycled through their respective time slots based upon successive operation in the respective adsorption stages and, upon the isolation of an adsorber i in its time slot j of even number, the adsorbers numbered up to $$\left(i + \frac{j}{2} - 1\right)$$

are cycled to further time slots in their original sequence prior to the establishment of a new sequence for said remaining adsorbers.

9. The method defined in claim 1 wherein each of the adsorbers in the installation is assigned a number from 1 to n in the sequence in which the respective adsorbers are cycled through their respective time slots based upon successive operation in the respective adsorption stages and, upon the isolation of one of the adsorbers numbered i in a time slot j of odd number, the adsorbers of numbers up to $$i + \frac{(j + 1)}{2} - 1$$

are operated to further time slots in their original sequences prior to establishing the new sequences.

10. The method defined in claim 8 or claim 9 wherein all of the remaining adsorbers, apart from those continued in their original sequence for two time slots, are held in their original time slot and phase upon isolation of the adsorber associated with the defective elements.

11. The method defined in claim 10 wherein at least some of the adsorbers retained in their respective phases upon isolation of the adsorber associated with the defective elements are vented through additional valves.

12. The method defined in claim 10 wherein the isolated adsorber is vented.

13. The method defined in claim 8 or claim 9 wherein the installation is used for the cleaning of a gas and wherein the volume rate of flow of the gas to be cleaned at the installation during the two sequences remains constant during the two time slots through which the original sequence is maintained.

14. The method defined in claim 13 wherein the volume of the gas to be cleaned per adsorber after the two time slots at the original sequence is increased by a factor $$\frac{n_A}{n_A - x}$$

wherein $n_A$ equals the number of adsorbers simultaneously operating in the adsorption stage and x is the number of isolated adsorbers.

* * * * *